US012686798B2

(12) United States Patent
Liu

(10) Patent No.: US 12,686,798 B2
(45) Date of Patent: Jul. 21, 2026

(54) ANTI-BLUE LIGHT OCA OPTICAL COMPOSITION FOR SCREEN AND PREPARATION METHOD THEREOF

(71) Applicant: WTL Technology Shenzhen CO., LTD., Shenzhen (CN)

(72) Inventor: Tak Nam Liu, Shenzhen (CN)

(73) Assignee: WTL Technology Shenzhen CO., LTD., Shenzhen (CN)

( * ) Notice: Subject to any disclaimer, the term of this patent is extended or adjusted under 35 U.S.C. 154(b) by 184 days.

(21) Appl. No.: 18/744,737

(22) Filed: Jun. 17, 2024

(65) Prior Publication Data

US 2025/0361428 A1     Nov. 27, 2025

(30) Foreign Application Priority Data

May 23, 2024    (CN) .......................... 202410650430.1

(51) Int. Cl.
| | |
|---|---|
| *C09J 7/40* | (2018.01) |
| *C09J 7/25* | (2018.01) |
| *C09J 11/04* | (2006.01) |
| *C09J 11/06* | (2006.01) |
| *C09J 133/08* | (2006.01) |
| *C09J 183/04* | (2006.01) |

(52) U.S. Cl.
CPC .............. *C09J 7/405* (2018.01); *C09J 7/255* (2018.01); *C09J 11/04* (2013.01); *C09J 11/06* (2013.01); *C09J 133/08* (2013.01); *C09J*

*183/04* (2013.01); *C09J 2301/1242* (2020.08); *C09J 2301/408* (2020.08); *C09J 2301/41* (2020.08); *C09J 2301/50* (2020.08); *C09J 2467/006* (2013.01)

(58) Field of Classification Search
CPC .......... C09J 2467/006; C09J 2301/1242; C09J 2301/408; C09J 2301/41; C09J 2301/50; C09J 183/04; C09J 133/08; C09J 11/06; C09J 11/04; C09J 7/255; C09J 7/405
See application file for complete search history.

(56) References Cited

PUBLICATIONS

Machine translation of CN 219449599 (Year: 2023).*
Machine translation of CN 116507595 (Year: 2023).*

* cited by examiner

*Primary Examiner* — Vishal I Patel
(74) *Attorney, Agent, or Firm* — Jose Cherson Weissbrot

(57) ABSTRACT

The present application discloses an anti-blue light OCA optical composition for screen and a preparation method thereof, comprising an OCA adhesive body. The OCA adhesive body comprises a first release film, an OCA hybrid blue light barrier film, an optical PET substrate, a silicone film, and a second release film. The first release film comprises the following components by weight: 25-35 parts of nano cobalt oxide.

12 Claims, 8 Drawing Sheets

（a）

（b）

ANTI-BLUE LIGHT OCA OPTICAL COMPOSITION FOR SCREEN AND PREPARATION METHOD THEREOF

TECHNICAL FIELD

The present application relates to the technical field of AB adhesive, specifically to an anti-blue light OCA optical composition for screen and its preparation method.

BACKGROUND

OCA optical adhesive is a substrate-free high-transparency double-sided adhesive tape with general cohesion, large fluidity, and easy deformation after extrusion, which is made of optical acrylic adhesive without substrate, and then each of the upper and lower bottom layers is coated with a release film. Currently, it is the best adhesive for touch screens, mainly used for material bonding on touch screens, achieving capacitive touch sensing effect and requiring high cleanliness. In short, OCA is a layer of special double-sided adhesive with optical transparency. OCA optical adhesive is one of the important raw materials for touch screens and is a substrate-free double-sided adhesive tape which is made of optical acrylic adhesive without substrate, and then each of the upper and lower bottom layers is coated with a release film.

The use of OCA optical adhesive can reduce glare, reduce the loss of light emitted by LCD or AMOLED displays, increase the brightness of displays, provide high transmittance, reduce energy consumption, and increase contrast, especially under strong light irradiation. The adhesion of OCA optical adhesive makes the surface connection have higher strength; avoid the phenomenon of Newton's rings; the surface of the product is flatter, free of wrinkles, bubbles, or impurities, and the display image is almost unaffected by OCA optical adhesive.

However, the conventional OCA optical adhesive has the following disadvantages:

Blue light is an important component of visible light, and there is a large number of irregular short-wave blue light in the visible light emitted by the screens of computers, mobile phones, digital cameras and other electronic products. The most harmful to the eyes is the high-energy short-wave blue light between 360 nm-500 nm, which will directly penetrate the cornea, causing damage to the retina in the fundus, leading to macular lesions, especially the blue light in the range of 450 nm-460 nm causes the greatest damage to the eyes. The traditional OCA optical adhesive can only block visible light alone, but the blocking efficiency of blue light is poor, which cannot meet the efficiency of people's requirement.

SUMMARY

The purpose of the present application is to provide an anti-blue light OCA optical composition for the screen and its preparation method, in order to solve the problems proposed in the background mentioned above that: blue light is an important component of visible light, and there is a large number of irregular short-wave blue light in the visible light emitted by the screens of computers, mobile phones, digital cameras and other electronic products. The most harmful to the eyes is the high-energy short-wave blue light between 360 nm-500 nm, which will directly penetrate the cornea, causing damage to the retina in the fundus, leading to macular lesions, especially the blue light in the range of 450 nm-460 nm causes the greatest damage to the eyes. The traditional OCA optical adhesive can only block visible light alone, but the blocking efficiency of blue light is poor, which cannot meet the efficiency of people's requirement.

To realize the above purpose, the present application provides the following technical solutions: the anti-blue light OCA optical composition for screen includes an OCA adhesive body, wherein the OCA adhesive body includes a first release film, an OCA hybrid blue light barrier film, an optical PET substrate, a silicone film, and a second release film; the first release film includes the following components by weight: 25-35 parts of nano cobalt oxide, 25-35 parts of o-phenyldimethylamine, 25-35 parts of benzoyl peroxide, and 10-40 parts of hexamethylphosphoramide. The OCA hybrid blue light barrier film includes the following components by weight: 20-40 parts of lauryl methacrylate, 20-40 parts of iso-octyl acrylate, and 20-40 parts of blue light barrier agent. The optical PET substrate includes the following components by weight: 10-30 parts of benzyl ester material, 10-30 parts of anthocyanin materials, 10-30 parts of silicon nitride, and 10-30 parts of benzophenone. The silicone film includes the following components by weight: 40-60 parts of silica gel, and 40-60 parts of hydrophilic polyurethane resin. The second release film comprises the following components: 25-35 parts of nano cobalt oxide, 25-35 parts by weight of o-phenyldimethylamine, 25-35 parts of benzoyl peroxide, and 10-40 parts of hexamethylphosphoramide.

Accordingly to a first preferred embodiment of the present application, the first release film includes the following components by weight: 35 parts of nano cobalt oxide, 25 parts of o-phenyldimethylamine, 25 parts of benzoyl peroxide, and 15 parts of hexamethylphosphoramide, wherein the OCA hybrid blue light barrier film includes by weight: 30 parts of lauryl methacrylate, 30 parts of iso-octyl acrylate, and 40 parts of blue light barrier agent; the optical PET substrate includes the following components by weight: 20 parts of benzyl ester material, 30 parts of anthocyanin materials, 20 parts of silicon nitride, and 30 parts of benzophenone. The silicone film includes the following components by weight: 40 parts of silica gel, and 60 parts of hydrophilic polyurethane resin. The second release film includes the following components by weight: 35 parts of nano cobalt oxide, 25 parts by weight of o-phenyldimethylamine, 25 parts of benzoyl peroxide, and 15 parts of hexamethylphosphoramide.

According to a second preferred embodiment of the present application, the first release film includes the following components by weight: 25 parts of nano cobalt oxide, 25 parts of o-phenyldimethylamine, 25 parts of benzoyl peroxide, and 25 parts of hexamethylphosphoramide. The OCA hybrid blue light barrier film includes the following components by weight: 40 parts of lauryl methacrylate, 20 parts of iso-octyl acrylate, and 40 parts of blue light barrier agent. The optical PET substrate includes the following components by weight: 10 parts of benzyl ester material, 30 parts of anthocyanin materials, 30 parts of silicon nitride, and 30 parts of benzophenone. The silicone film includes the following components by weight: 60 parts of silica gel, and 40 parts of hydrophilic polyurethane resin. The second release film includes the following components by weight: 25 parts of nano cobalt oxide, 25 parts by weight of o-phenyldimethylamine, 25 parts of benzoyl peroxide, and 25 parts of hexamethylphosphoramide.

According to a third preferred embodiment of the present application, the first release film includes the following components by weight: 25 parts of nano cobalt oxide, 25 parts of o-phenyldimethylamine, 35 parts of benzoyl perox-
ide, and 15 parts of hexamethylphosphoramide. The OCA
hybrid blue light barrier film includes the following com-
ponents by weight: 40 parts of lauryl methacrylate, 40 parts
of iso-octyl acrylate, and 20 parts of blue light barrier agent.
The optical PET substrate includes the following compo-
nents by weight: 25 parts of benzyl ester material, 25 parts
of anthocyanin materials, 25 parts of silicon nitride, and 25
parts of benzophenone. The silicone film includes the fol-
lowing components by weight: 50 parts of silica gel, and 50
parts of hydrophilic polyurethane resin. The second release
film includes the following components by weight: 25 parts
of nano cobalt oxide, 25 parts by weight of o-phenyldim-
ethylamine, 35 parts of benzoyl peroxide, and 15 parts of
hexamethylphosphoramide.

According to a fourth preferred embodiment of the pres-
ent application, the first release film includes the following
components by weight: 25 parts of nano cobalt oxide, 35
parts of o-phenyldimethylamine, 25 parts of benzoyl perox-
ide, and 15 parts of hexamethylphosphoramide. The OCA
hybrid blue light barrier film includes the following com-
ponents by weight: 20 parts of lauryl methacrylate, 40 parts
of iso-octyl acrylate, and 40 parts of blue light barrier agent.
The optical PET substrate includes the following compo-
nents by weight: 30 parts of benzyl ester material, 20 parts
of anthocyanin materials, 30 parts of silicon nitride, and 20
parts of benzophenone. The silicone film includes the fol-
lowing components y weight: 45 parts of silica gel, and 55
parts of hydrophilic polyurethane resin. The second release
film includes the following components by weight: 25 parts
of nano cobalt oxide, 35 parts by weight of o-phenyldim-
ethylamine, 25 parts of benzoyl peroxide, and 15 parts of
hexamethylphosphoramide.

According to a fifth preferred embodiment of the present
application, the blue light barrier agent is an Er fluorescent
powder.

The preparation method of the anti-blue light OCA optical
composition for screen of the present application includes
the following steps:

Step 1, Structural design: design the thickness of the first
release film, the thickness of the OCA hybrid blue light
barrier film, the thickness of the optical PET substrate, the
thickness of the silicone film, and the thickness of the second
release film according to the requirements of the OCA
adhesive body;

Step 2, Single layer preparation: prepare the first release
film, the OCA hybrid blue light barrier film, the optical PET
substrate, the silicone film, and the second release film
respectively according to the requirements of structural
design;

Step 3, Co-extrusion: the first release film, OCA hybrid
blue light barrier film, optical PET substrate, silicone film,
and second release film are extruded together to synthesize
OCA adhesive body;

Step 4, Surface treatment: apply coating and sputtering
treatment to the OCA adhesive body.

According to a sixth preferred embodiment of the present
application, the specific process for preparing the first
release film in the second step is as follows: S1, Mass
weighing: Weigh 25-35 parts of nano cobalt oxide, 25-35
parts of o-phenyldimethylamine, 25-35 parts of benzoyl
peroxide, and 10-40 parts of hexamethylphosphoramide; S2,
Sputtering coating: Inject gas in a vacuum environment and
apply high voltage to trigger discharge, and the ions gener-
ated during the discharge process collide with the target,
causing the target material to fly out and collide with the
substrate to form a thin film; The specific process for preparing the OCA hybrid blue light barrier film (3) is as
follows: S1, Mass weighing: Weigh 20-40 parts of lauryl
methacrylate, 20-40 parts of iso-octyl acrylate, and 20-40
parts of blue light barrier agent; S2, Sputtering coating:
Inject gas in a vacuum environment and apply high voltage
to trigger discharge, and the ions generated during the
discharge process collide with the target, causing the target
material to fly out and collide with the substrate to form a
thin film; The specific process for preparing the optical PET
substrate (4) is as follows: S1, Mass weighing: Weigh 10-30
parts of benzyl ester material, 10-30 parts of anthocyanin
materials, 10-30 parts of silicon nitride, and 10-30 parts of
benzophenone; S2, Sputtering coating: Inject gas in a
vacuum environment and apply high voltage to trigger
discharge, and the ions generated during the discharge
process collide with the target, causing the target material to
fly out and collide with the substrate to form a thin film; The
specific process for preparing the silicone film (5) is as
follows: S1, Mass weighing: Weigh 40-60 parts of silica gel,
and 40-60 parts of hydrophilic polyurethane resin; S2,
Sputtering coating: Inject gas in a vacuum environment and
apply high voltage to trigger discharge, and the ions gener-
ated during the discharge process collide with the target,
causing the target material to fly out and collide with the
substrate to form a thin film; The specific process for
preparing the second release film (6) is as follows: S1, Mass
weighing: Weigh 25-35 parts of nano cobalt oxide, 25-35
parts by weight of o-phenyldimethylamine, 25-35 parts of
benzoyl peroxide, and 10-40 parts of hexamethylphosphor-
amide; S2, Sputtering coating: Inject gas in a vacuum
environment and apply high voltage to trigger discharge, and
the ions generated during the discharge process collide with
the target, causing the target material to fly out and collide
with the substrate to form a thin film.

Compared to the prior art, the beneficial effects of the
present application are:

1. By setting the first release film and the second release
film, the nano cobalt oxide employed can effectively
absorb blue light, while o-phenyldimethylamine and
hexamethylphosphoramide synergize with it can fur-
ther improve the effect of blue light absorption, thus
ensuring that the anti-blue light film has a good filtering
effect of blue light;

2. By setting the OCA hybrid blue light barrier film, and
compounding raw materials, the product achieves
excellent blue light neutralization and filtration effects.
Er fluorescent powder is a kind of anti-blue light agent
with a pan-golden color that has the effect of absorbing
and converting blue light bands, improving its aesthet-
ics while increasing its anti-blue light effect to meet
people's needs.

In which: 1. OCA adhesive body; 2. the first release film; 3. the OCA hybrid blue light barrier film; 4. the optical PET substrate; 5. the silicone film; 6. the second release film.

DETAILED DESCRIPTION OF THE EMBODIMENTS

The technical solutions in the embodiments of the present application is described clearly and completely in conjunction with the embodiments of the present application. It should be appreciated that the described embodiments are only a part of the embodiments of the present application, not all of them. Based on the embodiments of the present application, all other embodiments obtained by a person of ordinary skill in the art without creative labor are within the scope of protection of the present application.

Example 1

Figure 1:
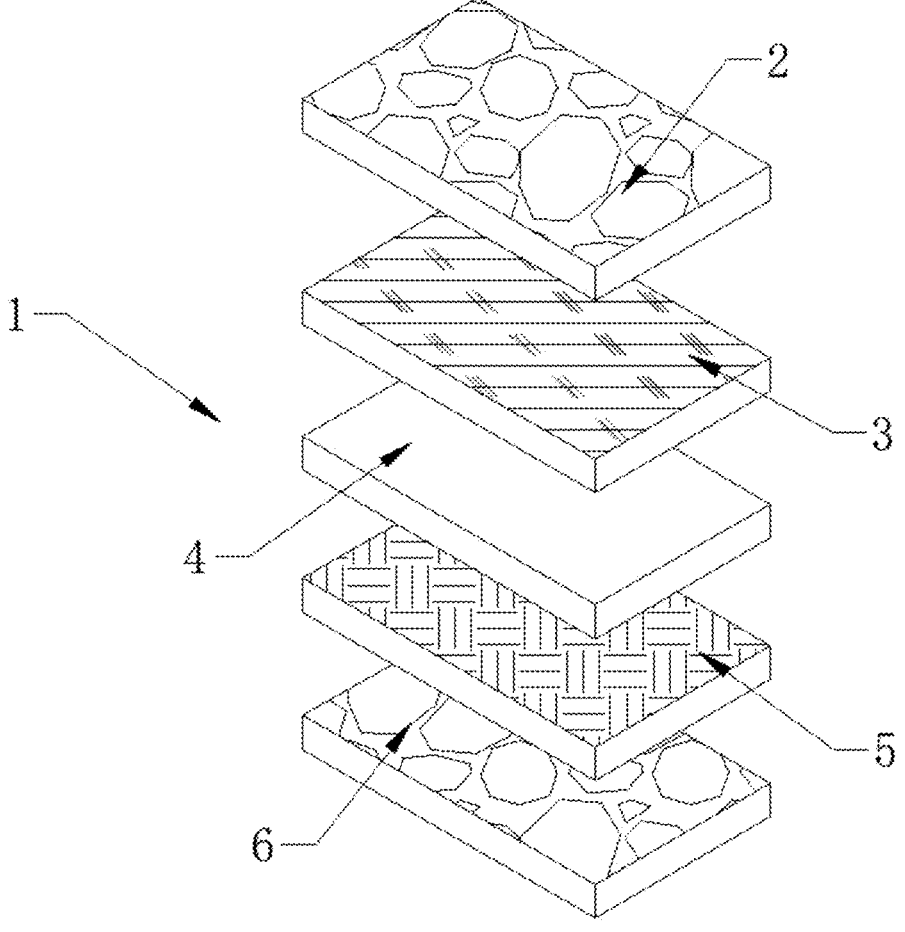
FIG. 1 is a schematic diagram of the OCA adhesive body
of the application.
Figure 2:
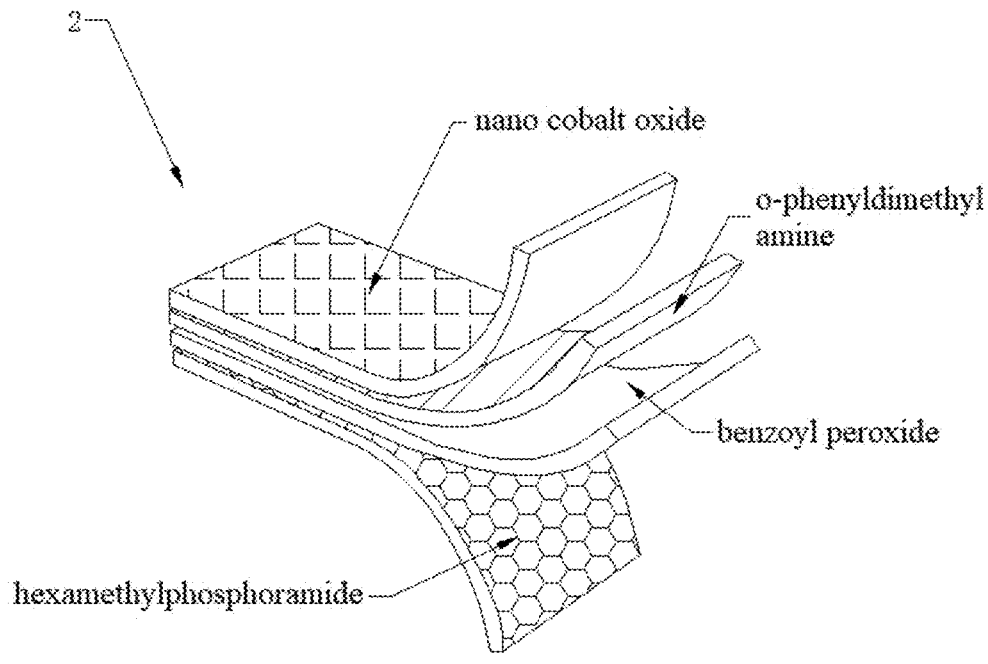
FIG. 2 is a schematic diagram of the first release film of
the application.
Figure 3:
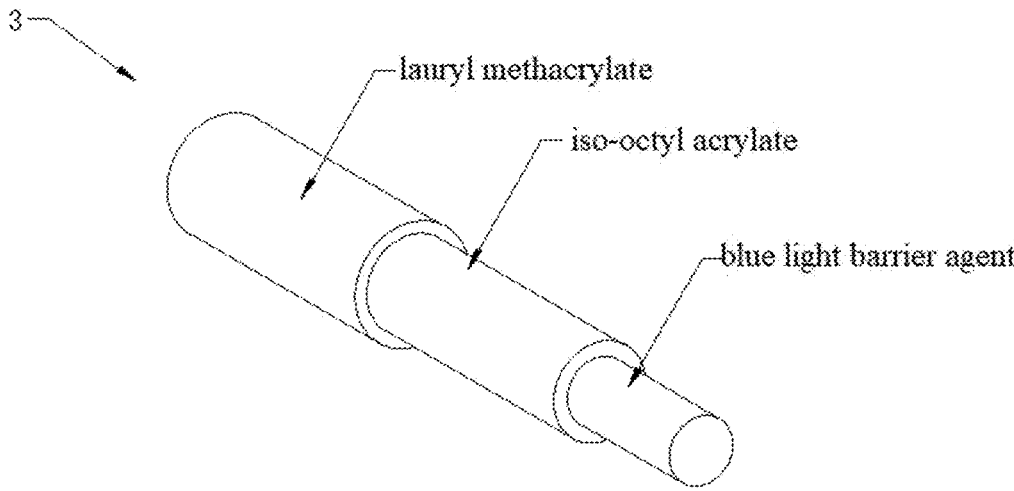
FIG. 3 is a schematic diagram of the OCA hybrid blue
light barrier film of the application.
Figure 4:
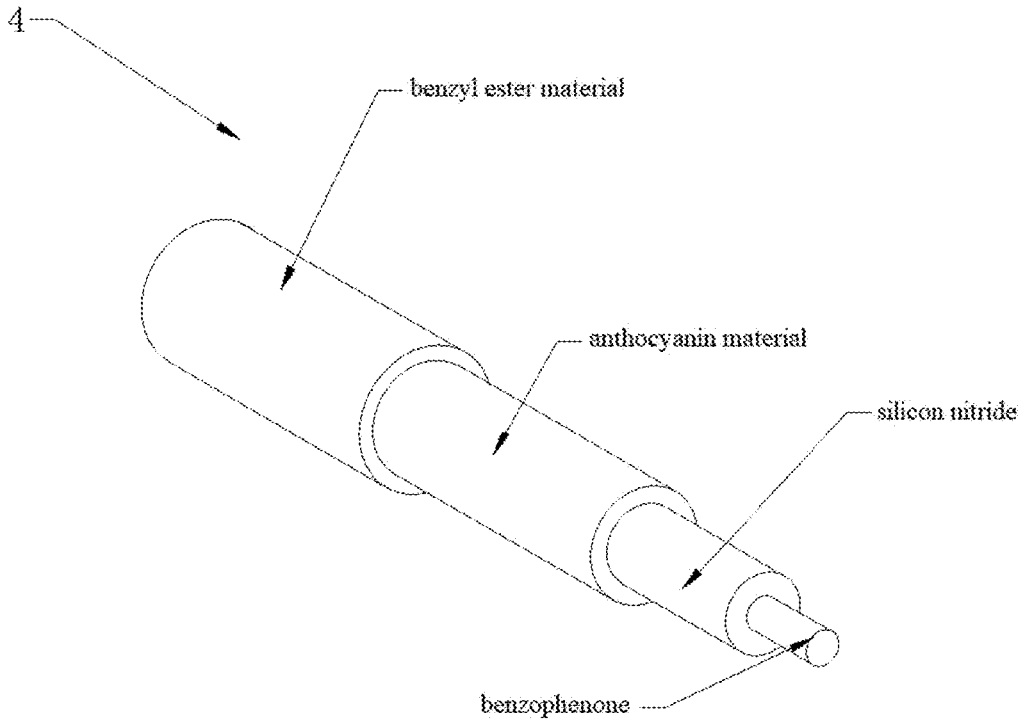
FIG. 4 is a schematic diagram of the optical PET substrate
of the application.
Figure 5:
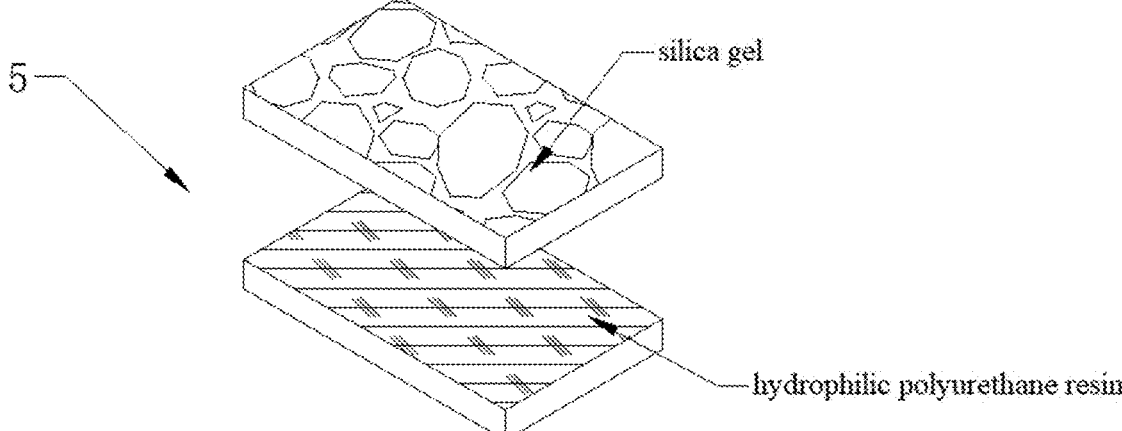
FIG. 5 is a schematic diagram of the silicone film of the
application.
Figure 6:
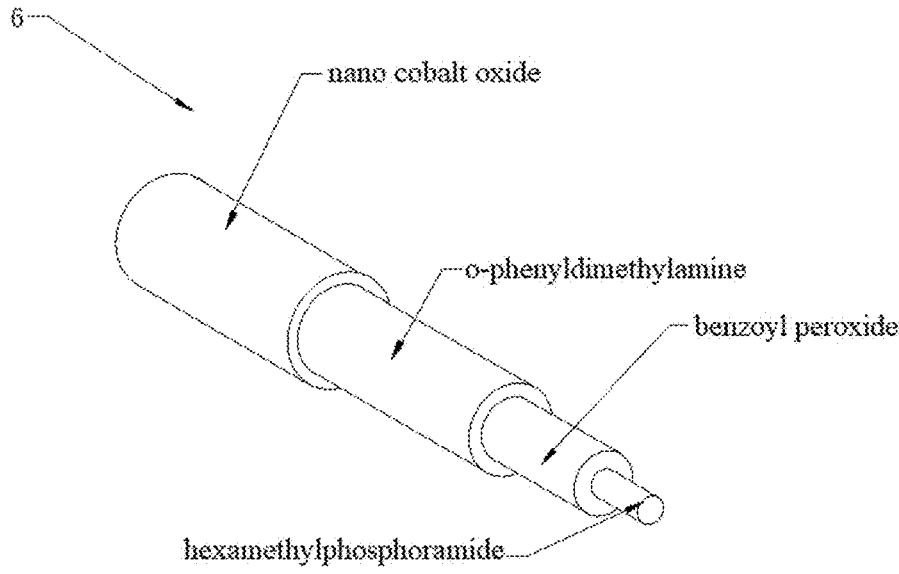
FIG. 6 is a schematic diagram of the second release film
of the application.
Figure 7:
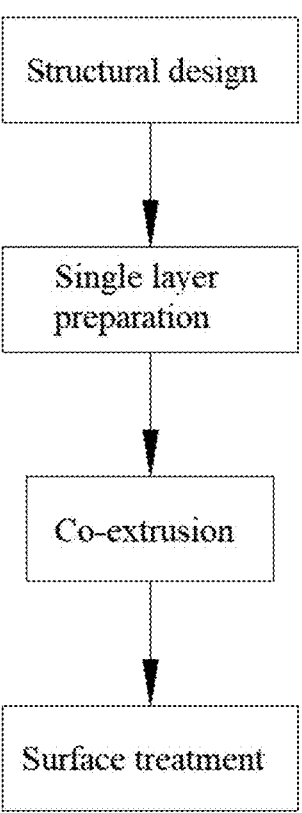
FIG. 7 is a flow chart of the application.
Figure 8:
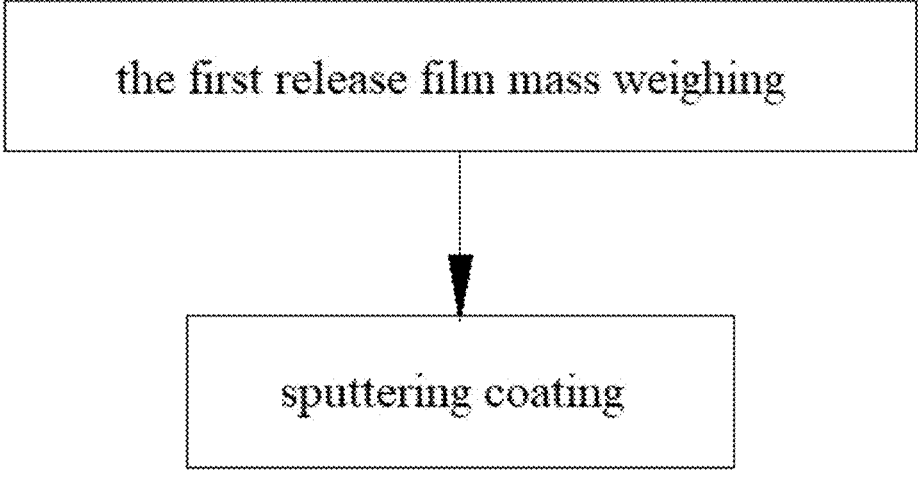
FIG. 8 is a flow chart of the first release film of the application.
Figure 9:
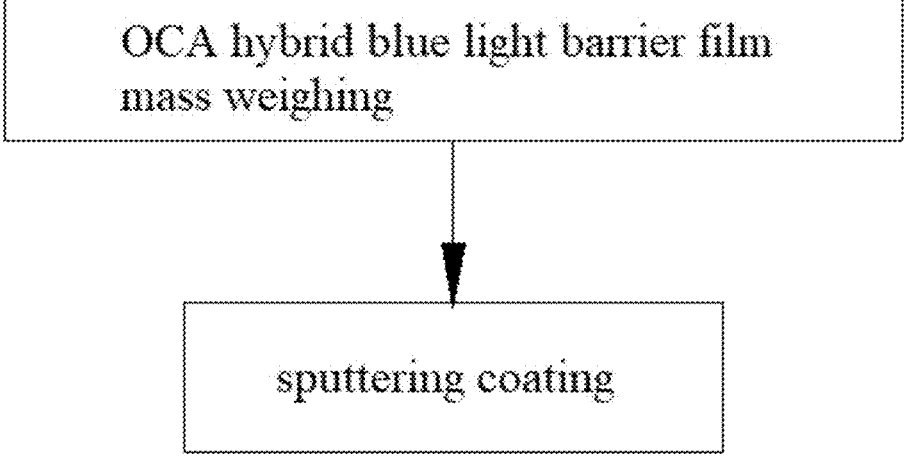
FIG. 9 is a flow chart of the OCA hybrid blue light barrier film of the application.
Figure 10:
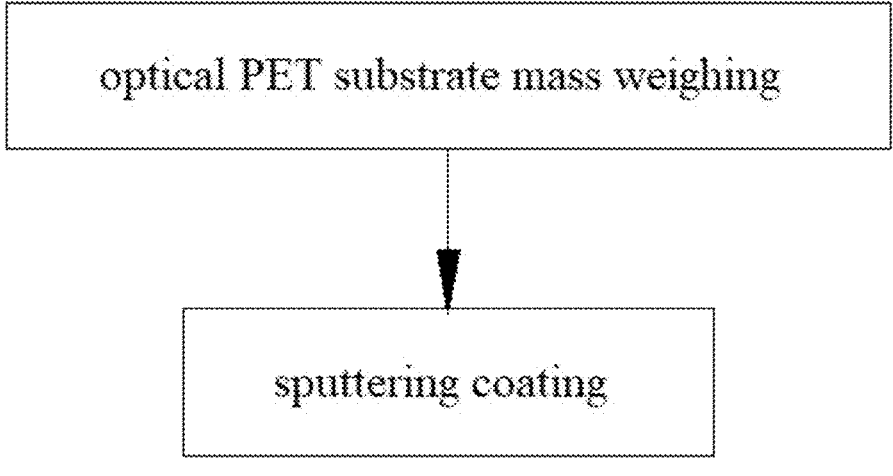
FIG. 10 is a flow chart of the optical PET substrate of the application.
Figure 11:
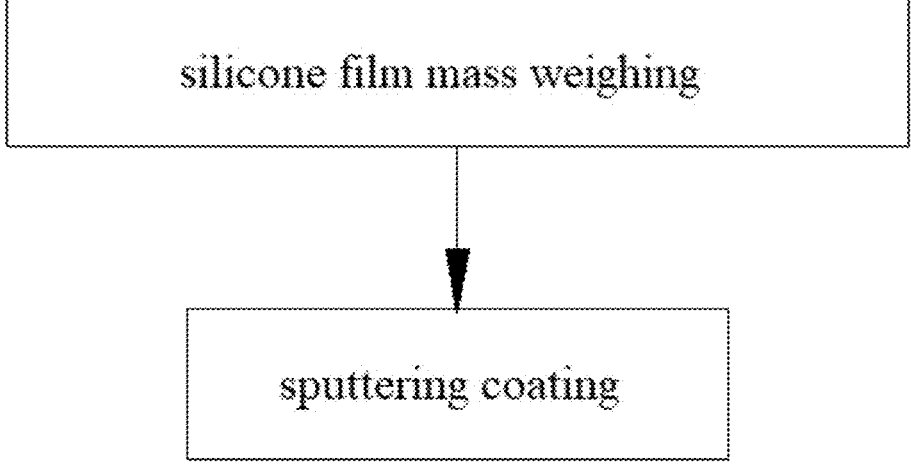
FIG. 11 is a flow chart of the silicone film of the application.
Figure 12:
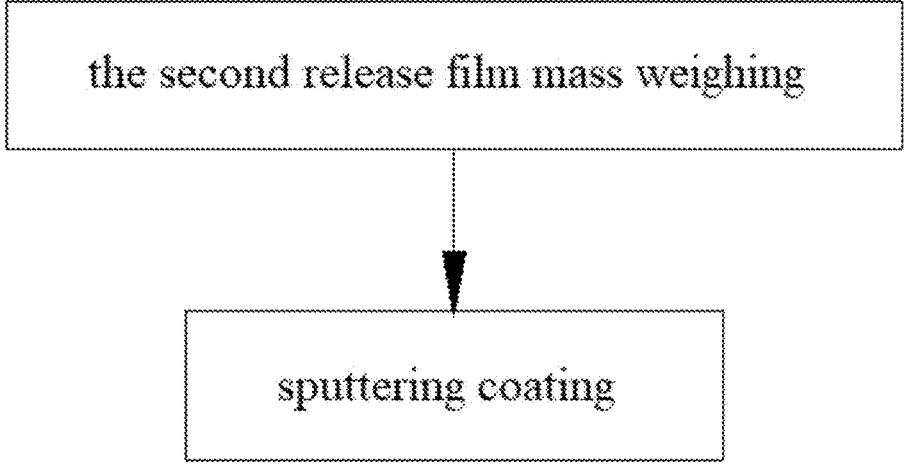
FIG. 12 is a flow chart of the second release film of the application.
Figure 13:
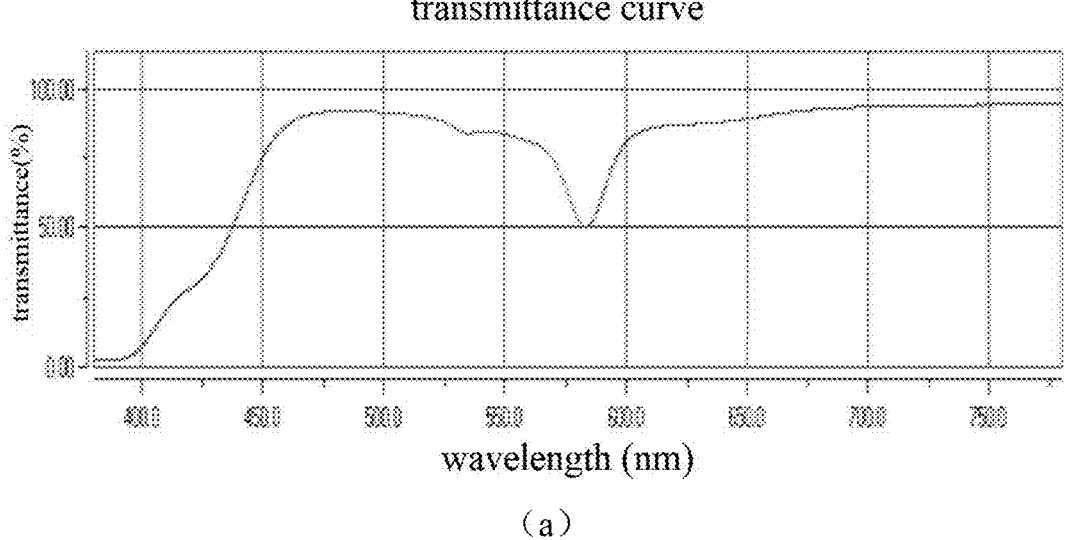
FIG. 13 is a band barrier curve of the material of the application.
Figure 13:
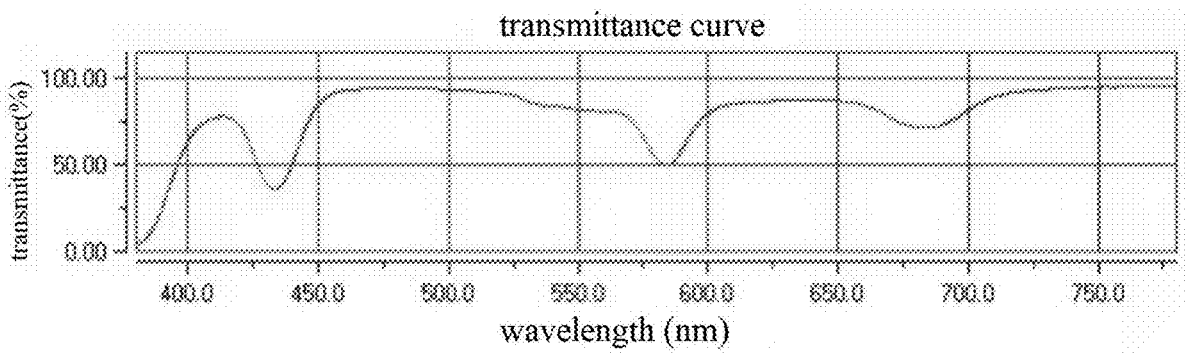

Referring to FIG. 1-13, the present application provides an anti-blue light OCA optical composition for screen includes an OCA adhesive body 1, wherein the OCA adhesive body 1 includes a first release film 2, an OCA hybrid blue light barrier film 3, an optical PET substrate 4, a silicone film 5, and a second release film 6. The first release film 2 includes the following components by weight: 25-35 parts of nano cobalt oxide, 25-35 parts of o-phenyldimethylamine, 25-35 parts of benzoyl peroxide, and 10-40 parts of hexamethylphosphoramide. The OCA hybrid blue light barrier film 3 includes the following components by weight: 20-40 parts of lauryl methacrylate, 20-40 parts of iso-octyl acrylate, and 20-40 parts of blue light barrier agent. The optical PET substrate 4 includes the following components by weight: 10-30 parts of benzyl ester material, 10-30 parts of anthocyanin materials, 10-30 parts of silicon nitride, and 10-30 parts of benzophenone. The silicone film 5 includes the following components by weight: 40-60 parts of silica gel, and 40-60 parts of hydrophilic polyurethane resin. The second release film 6 includes the following components by weight: 25-35 parts of nano cobalt oxide, 25-35 parts by weight of o-phenyldimethylamine, 25-35 parts of benzoyl peroxide, and 10-40 parts of hexamethylphosphoramide.

The blue light barrier agent is an Er fluorescent powder.

The preparation method of the anti-blue light OCA optical composition for screen of the present application includes the following steps:

Step 1, Structural design: design the thickness of the first release film 2, the thickness of the OCA hybrid blue light barrier film 3, the thickness of the optical PET substrate 4, the thickness of the silicone film 5, and the thickness of the second release film 6 according to the requirements of the OCA adhesive body 1.

Step 2, Single layer preparation: prepare the first release film 2, the OCA hybrid blue light barrier film 3, the optical PET substrate 4, the silicone film 5, and the second release film 6 respectively according to the requirements of structural design.

Step 3, Co-extrusion: the first release film 2, OCA hybrid blue light barrier film 3, optical PET substrate 4, silicone film 5, and second release film 6 are extruded together to synthesize OCA adhesive body 1.

Step 4, Surface treatment: apply coating and sputtering treatment to the OCA adhesive body 1.

The specific process for preparing the first release film 2 in the second step is as follows: S1, Mass weighing: Weigh 25-35 parts of nano cobalt oxide, 25-35 parts of o-phenyldimethylamine, 25-35 parts of benzoyl peroxide, and 10-40 parts of hexamethylphosphoramide; S2, Sputtering coating: Inject gas in a vacuum environment and apply high voltage to trigger discharge, and the ions generated during the discharge process collide with the target, causing the target material to fly out and collide with the substrate to form a thin film. The specific process for preparing the OCA hybrid blue light barrier film (3) is as follows: S1, Mass weighing: Weigh 20-40 parts of lauryl methacrylate, 20-40 parts of iso-octyl acrylate, and 20-40 parts of blue light barrier agent; S2, Sputtering coating: Inject gas in a vacuum environment and apply high voltage to trigger discharge, and the ions generated during the discharge process collide with the target, causing the target material to fly out and collide with the substrate to form a thin film. The specific process for preparing the optical PET substrate (4) is as follows: S1, Mass weighing: Weigh 10-30 parts of benzyl ester material, 10-30 parts of anthocyanin materials, 10-30 parts of silicon nitride, and 10-30 parts of benzophenone; S2, Sputtering coating: Inject gas in a vacuum environment and apply high voltage to trigger discharge, and the ions generated during the discharge process collide with the target, causing the target material to fly out and collide with the substrate to form a thin film. The specific process for preparing the silicone film (5) is as follows: S1, Mass weighing: Weigh 40-60 parts of silica gel, and 40-60 parts of hydrophilic polyurethane resin; S2, Sputtering coating: Inject gas in a vacuum environment and apply high voltage to trigger discharge, and the ions generated during the discharge process collide with the target, causing the target material to fly out and collide with the substrate to form a thin film. The specific process for preparing the second release film (6) is as follows: S1, Mass weighing: Weigh 25-35 parts of nano cobalt oxide, 25-35 parts by weight of o-phenyldimethylamine, 25-35 parts of benzoyl peroxide, and 10-40 parts of hexamethylphosphoramide; S2, Sputtering coating: Inject gas in a vacuum environment and apply high voltage to trigger discharge, and the ions generated during the discharge process collide with the target, causing the target material to fly out and collide with the substrate to form a thin film.

Example 2

Referring to FIG. 1-13, the present application provided an anti-blue light OCA optical composition for screen included an OCA adhesive body 1, wherein the OCA adhesive body 1 included a first release film 2, an OCA hybrid blue light barrier film 3, an optical PET substrate 4, a silicone film 5, and a second release film 6. The first release film 2 included the following components by weight: 35 parts of nano cobalt oxide, 25 parts of o-phenyldimethylamine, 25 parts of benzoyl peroxide, and 15 parts of hexamethylphosphoramide. The OCA hybrid blue light barrier film 3 included the following components by weight: 30 parts of lauryl methacrylate, 30 parts of iso-octyl acrylate, and 40 parts of blue light barrier agent. The optical PET substrate 4 included the following components by weight: 20 parts of benzyl ester material, 30 parts of anthocyanin materials, 20 parts of silicon nitride, and 30 parts of benzophenone. The silicone film 5 included the following components by weight: 40 parts of silica gel, and 60 parts of hydrophilic polyurethane resin. The second release film 6 included the following components by weight: 35 parts of nano cobalt oxide, 25 parts by weight of o-phenyldimethylamine, 25 parts of benzoyl peroxide, and 15 parts of hexamethylphosphoramide.

The blue light barrier agent was an Er fluorescent powder.

The preparation method of the anti-blue light OCA optical composition for screen of the present application included the following steps:

Step 1, Structural design: designed the thickness of the first release film 2, the thickness of the OCA hybrid blue light barrier film 3, the thickness of the optical PET substrate 4, the thickness of the silicone film 5, and the thickness of the second release film 6 according to the requirements of the OCA adhesive body 1.

Step 2, Single layer preparation: prepared the first release film 2, the OCA hybrid blue light barrier film 3, the optical PET substrate 4, the silicone film 5, and the second release film 6 respectively according to the requirements of structural design.

Step 3, Co-extrusion: the first release film 2, OCA hybrid blue light barrier film 3, optical PET substrate 4, silicone film 5, and second release film 6 were extruded together to synthesize OCA adhesive body 1.

Step 4, Surface treatment: applied coating and sputtering treatment to the OCA adhesive body 1.

The specific process for preparing the first release film 2 in the second step was as follows: S1, Mass weighing: Weighed 35 parts of nano cobalt oxide, 25 parts of o-phenyldimethylamine, 25 parts of benzoyl peroxide, and 15 parts of hexamethylphosphoramide; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the OCA hybrid blue light barrier film (3) was as follows: S1, Mass weighing: Weighed 30 parts of lauryl methacrylate, 30 parts of iso-octyl acrylate, and 40 parts of blue light barrier agent; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the optical PET substrate (4) was as follows: S1, Mass weighing: Weighed 20 parts of benzyl ester material, 30 parts of anthocyanin materials, 20 parts of silicon nitride, and 30 parts of benzophenone; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the silicone film (5) was as follows: S1, Mass weighing: Weighed 40 parts of silica gel, and 60 parts of hydrophilic polyurethane resin; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the second release film (6) was as follows: S1, Mass weighing: Weighed 35 parts of nano cobalt oxide, 25 parts by weight of o-phenyldimethylamine, 25 parts of benzoyl peroxide, and 15 parts of hexamethylphosphoramide; S2, Sputtering coating: Injected gas in a vacuum environment and applied high voltage to trigger discharge, and the ions generated during the discharge process collided with the target, causing the target material to fly out and collide with the substrate to form a thin film.

Example 3

Referring to FIG. 1-13, the present application provided an anti-blue light OCA optical composition for screen included an OCA adhesive body 1, wherein the OCA adhesive body 1 included a first release film 2, an OCA hybrid blue light barrier film 3, an optical PET substrate 4, a silicone film 5, and a second release film 6. The first release film 2 included the following components by weight: 25 parts of nano cobalt oxide, 25 parts of o-phenyldimethylamine, 25 parts of benzoyl peroxide, and 25 parts of hexamethylphosphoramide. The OCA hybrid blue light barrier film 3 included the following components by weight: 40 parts of lauryl methacrylate, 20 parts of iso-octyl acrylate, and 40 parts of blue light barrier agent. The optical PET substrate 4 included the following components by weight: 10 parts of benzyl ester material, 30 parts of anthocyanin materials, 30 parts of silicon nitride, and 30 parts of benzophenone. The silicone film 5 included the following components by weight: 60 parts of silica gel, and 40 parts of hydrophilic polyurethane resin. The second release film 6 included the following components by weight: 25 parts of nano cobalt oxide, 25 parts by weight of o-phenyldimethylamine, 25 parts of benzoyl peroxide, and 25 parts of hexamethylphosphoramide.

The blue light barrier agent was an Er fluorescent powder.

The preparation method of the anti-blue light OCA optical composition for screen of the present application included the following steps:

Step 1, Structural design: designed the thickness of the first release film 2, the thickness of the OCA hybrid blue light barrier film 3, the thickness of the optical PET substrate 4, the thickness of the silicone film 5, and the thickness of the second release film 6 according to the requirements of the OCA adhesive body 1.

Step 2, Single layer preparation: prepared the first release film 2, the OCA hybrid blue light barrier film 3, the optical PET substrate 4, the silicone film 5, and the second release film 6 respectively according to the requirements of structural design.

Step 3, Co-extrusion: the first release film 2, OCA hybrid blue light barrier film 3, optical PET substrate 4, silicone film 5, and second release film 6 were extruded together to synthesize OCA adhesive body 1.

Step 4, Surface treatment: applied coating and sputtering treatment to the OCA adhesive body 1.

The specific process for preparing the first release film 2 in the second step was as follows: S1, Mass weighing: Weighed 25 parts of nano cobalt oxide, 25 parts of o-phenyldimethylamine, 25 parts of benzoyl peroxide, and 25 parts of hexamethylphosphoramide; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the OCA hybrid blue light barrier film (3) was as follows: S1, Mass weighing: Weighed 40 parts of lauryl methacrylate, 20 parts of iso-octyl acrylate, and 40 parts of blue light barrier agent; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the optical PET substrate (4) was as follows: S1, Mass weighing: Weighed 10 parts of benzyl ester material, 30 parts of anthocyanin materials, 30 parts of silicon nitride, and 30 parts of benzophenone; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the silicone film (5) was as follows: S1, Mass weighing: Weighed 60 parts of silica gel, and 40 parts of hydrophilic polyurethane resin; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the second release film (6) was as follows: S1, Mass weighing: Weighed 25 parts of nano cobalt oxide, 25 parts by weight of o-phenyldimethylamine, 25 parts of benzoyl peroxide, and 25 parts of hexamethylphosphoramide; S2, Sputtering coating: Injected gas in a vacuum environment and applied high voltage to trigger discharge, and the ions generated during the discharge process collided with the target, causing the target material to fly out and collide with the substrate to form a thin film.

Example 4

Referring to FIG. 1-13, the present application provided an anti-blue light OCA optical composition for screen included an OCA adhesive body 1, wherein the OCA adhesive body 1 included a first release film 2, an OCA hybrid blue light barrier film 3, an optical PET substrate 4, a silicone film 5, and a second release film 6. The first release film 2 included the following components by weight: 25 parts of nano cobalt oxide, 25 parts of o-phenyldimethylamine, 35 parts of benzoyl peroxide, and 15 parts of hexamethylphosphoramide. The OCA hybrid blue light barrier film 3 included the following components by weight: 40 parts of lauryl methacrylate, 40 parts of iso-octyl acrylate, and 20 parts of blue light barrier agent. The optical PET substrate 4 included the following components by weight: 25 parts of benzyl ester material, 25 parts of anthocyanin materials, 25 parts of silicon nitride, and 25 parts of benzophenone. The silicone film 5 included the following components by weight: 50 parts of silica gel, and 50 parts of hydrophilic polyurethane resin. The second release film 6 included the following components by weight: 25 parts of nano cobalt oxide, 25 parts by weight of o-phenyldimethylamine, 35 parts of benzoyl peroxide, and 15 parts of hexamethylphosphoramide.

The blue light barrier agent was an Er fluorescent powder.

The preparation method of the anti-blue light OCA optical composition for screen of the present application included the following steps:

Step 1, Structural design: designed the thickness of the first release film 2, the thickness of the OCA hybrid blue light barrier film 3, the thickness of the optical PET substrate 4, the thickness of the silicone film 5, and the thickness of the second release film 6 according to the requirements of the OCA adhesive body 1.

Step 2, Single layer preparation: prepared the first release film 2, the OCA hybrid blue light barrier film 3, the optical PET substrate 4, the silicone film 5, and the second release film 6 respectively according to the requirements of structural design.

Step 3, Co-extrusion: the first release film 2, OCA hybrid blue light barrier film 3, optical PET substrate 4, silicone film 5, and second release film 6 were extruded together to synthesize OCA adhesive body 1.

Step 4, Surface treatment: applied coating and sputtering treatment to the OCA adhesive body 1.

The specific process for preparing the first release film 2 in the second step was as follows: S1, Mass weighing: Weighed 25 parts of nano cobalt oxide, 25 parts of o-phenyldimethylamine, 35 parts of benzoyl peroxide, and 15 parts of hexamethylphosphoramide; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the OCA hybrid blue light barrier film (3) was as follows: S1, Mass weighing: Weighed 40 parts of lauryl methacrylate, 40 parts of iso-octyl acrylate, and 20 parts of blue light barrier agent; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the optical PET substrate (4) was as follows: S1, Mass weighing: Weighed 25 parts of benzyl ester material, 25 parts of anthocyanin materials, 25 parts of silicon nitride, and 25 parts of benzophenone; S2, Sputtering coating: Injected gas in a vacuum environment and applied high voltage to trigger discharge, and the ions generated during the discharge process collide with the target, causing the target material to fly out and collide with the substrate to form a thin film. The specific process for preparing the silicone film (5) was as follows: S1, Mass weighing: Weighed 50 parts of silica gel, and 50 parts of hydrophilic polyurethane resin; S2, Sputtering coating: Injected gas in a vacuum environment and applied high voltage to trigger discharge, and the ions generated during the discharge process collided with the target, causing the target material to fly out and collide with the substrate to form a thin film. The specific process for preparing the second release film (6) was as follows: S1, Mass weighing: Weighed 25 parts of nano cobalt oxide, 25 parts by weight of o-phenyldimethylamine, 35 parts of benzoyl peroxide, and 15 parts of hexamethylphosphoramide; S2, Sputtering coating: Injected gas in a vacuum environment and applied high voltage to trigger discharge, and the ions generated during the discharge process collided with the target, causing the target material to fly out and collide with the substrate to form a thin film.

Example 5

Referring to FIG. 1-13, the present application provided an anti-blue light OCA optical composition for screen included an OCA adhesive body 1, wherein the OCA adhesive body 1 included a first release film 2, an OCA hybrid blue light barrier film 3, an optical PET substrate 4, a silicone film 5, and a second release film 6. The first release film 2 included the following components by weight: 25 parts of nano cobalt oxide, 35 parts of o-phenyldimethyl-amine, 25 parts of benzoyl peroxide, and 15 parts of hex-amethylphosphoramide. The OCA hybrid blue light barrier film 3 included the following components by weight: 20 parts of lauryl methacrylate, 40 parts of iso-octyl acrylate, and 40 parts of blue light barrier agent. The optical PET substrate 4 included the following components by weight: 30 parts of benzyl ester material, 20 parts of anthocyanin materials, 30 parts of silicon nitride, and 20 parts of ben-zophenone. The silicone film 5 included the following components by weight: 45 parts of silica gel, and 55 parts of hydrophilic polyurethane resin. The second release film 6 included the following components by weight: 25 parts of nano cobalt oxide, 35 parts by weight of o-phenyldimeth-ylamine, 25 parts of benzoyl peroxide, and 15 parts of hexamethylphosphoramide.

The blue light barrier agent was an Er fluorescent powder.

The preparation method of the anti-blue light OCA optical composition for screen of the present application included the following steps:

Step 1, Structural design: designed the thickness of the first release film 2, the thickness of the OCA hybrid blue light barrier film 3, the thickness of the optical PET substrate 4, the thickness of the silicone film 5, and the thickness of the second release film 6 according to the requirements of the OCA adhesive body 1.

Step 2, Single layer preparation: prepared the first release film 2, the OCA hybrid blue light barrier film 3, the optical PET substrate 4, the silicone film 5, and the second release film 6 respectively according to the requirements of structural design.

Step 3, Co-extrusion: the first release film 2, OCA hybrid blue light barrier film 3, optical PET substrate 4, silicone film 5, and second release film 6 were extruded together to synthesize OCA adhesive body 1.

Step 4, Surface treatment: applied coating and sputtering treatment to the OCA adhesive body 1.

The specific process for preparing the first release film 2 in the second step was as follows: S1, Mass weighing: Weighed 25 parts of nano cobalt oxide, 35 parts of o-phe-nyldimethylamine, 25 parts of benzoyl peroxide, and 15 parts of hexamethylphosphoramide; S2, Sputtering coating: Injected gas in a vacuum environment and applied high voltage to trigger discharge, and the ions generated during the discharge process collide with the target, causing the target material to fly out and collide with the substrate to form a thin film. The specific process for preparing the OCA hybrid blue light barrier film (3) was as follows: S1, Mass weighing: Weighed 20 parts of lauryl methacrylate, 40 parts of iso-octyl acrylate, and 40 parts of blue light barrier agent; S2, Sputtering coating: Injected gas in a vacuum environ-ment and applied high voltage to trigger discharge, and the ions generated during the discharge process collided with the target, causing the target material to fly out and collide with the substrate to form a thin film. The specific process for preparing the optical PET substrate (4) was as follows: S1, Mass weighing: Weighed 30 parts of benzyl ester material, 20 parts of anthocyanin materials, 30 parts of silicon nitride, and 20 parts of benzophenone; S2, Sputtering coating: Injected gas in a vacuum environment and applied high voltage to trigger discharge, and the ions generated during the discharge process collided with the target, caus-ing the target material to fly out and collide with the substrate to form a thin film. The specific process for preparing the silicone film (5) was as follows: S1, Mass weighing: Weighed 45 parts of silica gel, and 55 parts of hydrophilic polyurethane resin; S2, Sputtering coating:

Injected gas in a vacuum environment and applied high voltage to trigger discharge, and the ions generated during the discharge process collided with the target, causing the target material to fly out and collide with the substrate to form a thin film. The specific process for preparing the second release film (6) was as follows: S1, Mass weighing: Weighed 25 parts of nano cobalt oxide, 35 parts by weight of o-phenyldimethylamine, 25 parts of benzoyl peroxide, and 15 parts of hexamethylphosphoramide; S2, Sputtering coating: Injected gas in a vacuum environment and applied high voltage to trigger discharge, and the ions generated during the discharge process collided with the target, caus-ing the target material to fly out and collide with the substrate to form a thin film.

In the present application, according to the requirements of OCA adhesive body 1, the thickness of the first release film 2 was 0.05 mm, the thickness of OCA hybrid blue light barrier film 3 was 0.23 mm, the thickness of optical PET substrate 4 was 0.1 mm, the thickness of silicone film 5 was 0.06 mm and the thickness of the second release film 6 was 0.0075 mm. According to the requirements of structural design, the first release film 2, the OCA hybrid blue light barrier film 3, the optical PET substrate 4, the silicone film 5 and the second release film 6 were prepared respectively. The first release film 2, the OCA hybrid blue light barrier film 3, the optical PET substrate 4, the silicone film 5 and the second release film 6 were extruded together to synthesize OCA adhesive body 1; Applied coating and sputtering treatment to the OCA adhesive body 1.

In the present application, according to the requirements of OCA adhesive body 1, the thickness of the first release film 2 was 0.05 mm, the thickness of OCA hybrid blue light barrier film 3 was 0.125 mm, the thickness of optical PET substrate 4 was 0.1 mm, the thickness of silicone film 5 was 0.06 mm and the thickness of the second release film 6 was 0.0075 mm. According to the requirements of structural design, the first release film 2, the OCA hybrid blue light barrier film 3, the optical PET substrate 4, the silicone film 5 and the second release film 6 were prepared respectively. The first release film 2, the OCA hybrid blue light barrier film 3, the optical PET substrate 4, the silicone film 5 and the second release film 6 were extruded together to synthesize OCA adhesive body 1; Applied coating and sputtering treatment to the OCA adhesive body 1.

In the present application, according to the requirements of OCA adhesive body 1, the thickness of the first release film 2 was 0.05 mm, the thickness of OCA hybrid blue light barrier film 3 was 0.09 mm, the thickness of optical PET substrate 4 was 0.025 mm, the thickness of silicone film 5 was 0.045 mm and the thickness of the second release film 6 was 0.050 mm. According to the requirements of structural design, the first release film 2, the OCA hybrid blue light barrier film 3, the optical PET substrate 4, the silicone film 5 and the second release film 6 were prepared respectively. The first release film 2, the OCA hybrid blue light barrier film 3, the optical PET substrate 4, the silicone film 5 and the second release film 6 were extruded together to synthesize OCA adhesive body 1; Applied coating and sputtering treatment to the OCA adhesive body 1.

In the present application, according to the requirements of OCA adhesive body 1, the thickness of the first release film 2 was 0.05 mm, the thickness of OCA hybrid blue light barrier film 3 was 0.04 mm, the thickness of optical PET substrate 4 was 0.1 mm, the thickness of silicone film 5 was 0.05 mm and the thickness of the second release film 6 was 0.050 mm. According to the requirements of structural design, the first release film 2, the OCA hybrid blue light barrier film 3, the optical PET substrate 4, the silicone film 5 and the second release film 6 were prepared respectively. The first release film 2, the OCA hybrid blue light barrier film 3, the optical PET substrate 4, the silicone film 5 and the second release film 6 were extruded together to synthesize OCA adhesive body 1; Applied coating and sputtering treatment to the OCA adhesive body 1.

In the present application, according to the requirements of OCA adhesive body 1, the thickness of the first release film 2 was 0.05 mm, the thickness of OCA hybrid blue light barrier film 3 was 0.05 mm, the thickness of optical PET substrate 4 was 0.025 mm, the thickness of silicone film 5 was 0.045 mm and the thickness of the second release film 6 was 0.050 mm. According to the requirements of structural design, the first release film 2, the OCA hybrid blue light barrier film 3, the optical PET substrate 4, the silicone film 5 and the second release film 6 were prepared respectively. The first release film 2, the OCA hybrid blue light barrier film 3, the optical PET substrate 4, the silicone film 5 and the second release film 6 were extruded together to synthesize OCA adhesive body 1; Applied coating and sputtering treatment to the OCA adhesive body 1.

In the present application, the nano cobalt oxide employed can effectively absorb blue light, while o-phenyldimethylamine and hexamethylphosphoramide synergize with it can further improve the effect of blue light absorption, thus ensuring that the anti-blue light film has a good filtering effect of blue light; In combination with FIG. 13, FIG (a) shows the transmittance band waveform diagram of the blue light barrier composition according to the present application, and FIG. (b) shows the transmittance band waveform diagram of the Eyesafe blue light barrier composition.

Although the present application has been described in detail with reference to the aforementioned embodiments, those skilled in the art can still modify the technical solutions recorded in the aforementioned embodiments or make equivalent replacements to some of the technical features; any modification, equivalent replacement, improvement, etc. made within the spirit and principles of the present application shall be included in the scope of protection of the application.

What is claimed is:

1. An anti-blue light OCA optical composition for screen comprises an OCA adhesive body, wherein the OCA adhesive body comprises a first release film, an OCA hybrid blue light barrier film, an optical PET substrate, a silicone film, and a second release film;

wherein the first release film comprises the following components by weight: 25-35 parts of nano cobalt oxide, 25-35 parts of o-phenyldimethylamine, 25-35 parts of benzoyl peroxide, and 10-40 parts of hexamethylphosphoramide;

the OCA hybrid blue light barrier film comprises the following components by weight: 20-40 parts of lauryl methacrylate, 20-40 parts of iso-octyl acrylate, and 20-40 parts of blue light barrier agent;

the optical PET substrate comprises the following components by weight: 10-30 parts of benzyl ester material, 10-30 parts of anthocyanin materials, 10-30 parts of silicon nitride, and 10-30 parts of benzophenone;

the silicone film comprises the following components by weight: 40-60 parts of silica gel, and 40-60 parts of hydrophilic polyurethane resin;

the second release film comprises the following components by weight: 25-35 parts of nano cobalt oxide, 25-35 parts by weight of o-phenyldimethylamine, 25-35 parts of benzoyl peroxide, and 10-40 parts of hexamethylphosphoramide.

2. The anti-blue light OCA optical composition of claim 1, wherein the first release film comprises the following components by weight: 35 parts of nano cobalt oxide, 25 parts of o-phenyldimethylamine, 25 parts of benzoyl peroxide, and 15 parts of hexamethylphosphoramide;

the OCA hybrid blue light barrier film comprises the following components by weight: 30 parts of lauryl methacrylate, 30 parts of iso-octyl acrylate, and 40 parts of blue light barrier agent;

the optical PET substrate comprises the following components by weight: 20 parts of benzyl ester material, 30 parts of anthocyanin materials, 20 parts of silicon nitride, and 30 parts of benzophenone;

the silicone film comprises the following components by weight: 40 parts of silica gel, and 60 parts of hydrophilic polyurethane resin;

the second release film comprises the following components by weight: 35 parts of nano cobalt oxide, 25 parts by weight of o-phenyldimethylamine, 25 parts of benzoyl peroxide, and 15 parts of hexamethylphosphoramide.

3. The anti-blue light OCA optical composition of claim 1, wherein the first release film comprises the following components by weight: 25 parts of nano cobalt oxide, 25 parts of o-phenyldimethylamine, 25 parts of benzoyl peroxide, and 25 parts of hexamethylphosphoramide;

the OCA hybrid blue light barrier film comprises the following components by weight: 40 parts of lauryl methacrylate, 20 parts of iso-octyl acrylate, and 40 parts of blue light barrier agent;

the optical PET substrate comprises the following components by weight: 10 parts of benzyl ester material, 30 parts of anthocyanin materials, 30 parts of silicon nitride, and 30 parts of benzophenone;

the silicone film comprises the following components by weight: 60 parts of silica gel, and 40 parts of hydrophilic polyurethane resin;

the second release film comprises the following components by weight: 25 parts of nano cobalt oxide, 25 parts by weight of o-phenyldimethylamine, 25 parts of benzoyl peroxide, and 25 parts of hexamethylphosphoramide.

4. The anti-blue light OCA optical composition of claim 1, wherein the first release film comprises the following components by weight: 25 parts of nano cobalt oxide, 25 parts of o-phenyldimethylamine, 35 parts of benzoyl peroxide, and 15 parts of hexamethylphosphoramide;

the OCA hybrid blue light barrier film comprises the following components by weight: 40 parts of lauryl methacrylate, 40 parts of iso-octyl acrylate, and 20 parts of blue light barrier agent;

the optical PET substrate comprises the following components by weight: 25 parts of benzyl ester material, 25 parts of anthocyanin materials, 25 parts of silicon nitride, and 25 parts of benzophenone;

the silicone film comprises the following components by weight: 50 parts of silica gel, and 50 parts of hydrophilic polyurethane resin;

the second release film comprises the following components by weight: 25 parts of nano cobalt oxide, 25 parts by weight of o-phenyldimethylamine, 35 parts of benzoyl peroxide, and 15 parts of hexamethylphosphoramide.

5. The anti-blue light OCA optical composition of claim 1, wherein the first release film comprises the following components by weight: 25 parts of nano cobalt oxide, 35 parts of o-phenyldimethylamine, 25 parts of benzoyl peroxide, and 15 parts of hexamethylphosphoramide;

the OCA hybrid blue light barrier film comprises the following components by weight: 20 parts of lauryl methacrylate, 40 parts of iso-octyl acrylate, and 40 parts of blue light barrier agent;

the optical PET substrate comprises the following components by weight: 30 parts of benzyl ester material, 20 parts of anthocyanin materials, 30 parts of silicon nitride, and 20 parts of benzophenone;

the silicone film comprises the following components by weight: 45 parts of silica gel, and 55 parts of hydrophilic polyurethane resin;

the second release film comprises the following components by weight: 25 parts of nano cobalt oxide, 35 parts by weight of o-phenyldimethylamine, 25 parts of benzoyl peroxide, and 15 parts of hexamethylphosphoramide.

6. The anti-blue light OCA optical composition of claim 1, wherein the blue light barrier agent is an Er fluorescent powder.

7. A preparation method of the anti-blue light OCA optical composition for screen according to claim 1, comprising the following steps:

designing the thickness of the first release film, the thickness of the OCA hybrid blue light barrier film, the thickness of the optical PET substrate, the thickness of the silicone film, and the thickness of the second release film according to the requirements of the OCA adhesive body;

preparing the first release film, the OCA hybrid blue light barrier film, the optical PET substrate, the silicone film, and the second release film respectively according to the requirements of structural design;

extrude together the first release film, OCA hybrid blue light barrier film, optical PET substrate, silicone film, and second release film to synthesize OCA adhesive body;

applying coating and sputtering treatment to the OCA adhesive body.

8. The preparation method of claim 7, wherein the process for preparing the first release film in the second step comprises:

weighing 25-35 parts of nano cobalt oxide, 25-35 parts of o-phenylenediamine, 25-35 parts of benzoyl peroxide, and 10-40 parts of hexamethylphosphoramide;

injecting gas in a vacuum environment and apply high voltage to trigger discharge, and the ions generated during the discharge process collide with the target, causing the target material to fly out and collide with the substrate to form a thin film.

9. The preparation method of claim 7, wherein the process for preparing the OCA hybrid blue light barrier film comprises: weighing 20-40 parts of lauryl methacrylate, 20-40 parts of iso-octyl acrylate, and 20-40 parts of blue light barrier agent;

injecting gas in a vacuum environment and apply high voltage to trigger discharge, and the ions generated during the discharge process collide with the target, causing the target material to fly out and collide with the substrate to form a thin film.

10. The preparation method of claim 7, wherein the process for preparing the optical PET substrate comprises: weighing 10-30 parts of benzyl ester material, 10-30 parts of anthocyanin materials, 10-30 parts of silicon nitride, and 10-30 parts of benzophenone; injecting gas in a vacuum environment and apply high voltage to trigger discharge, and the ions generated during the discharge process collide with the target, causing the target material to fly out and collide with the substrate to form a thin film.

11. The preparation method of claim 7, wherein the process for preparing the silicone film comprises: weighing 40-60 parts of silica gel, and 40-60 parts of hydrophilic polyurethane resin; injecting gas in a vacuum environment and apply high voltage to trigger discharge, and the ions generated during the discharge process collide with the target, causing the target material to fly out and collide with the substrate to form a thin film.

12. The preparation method of claim 7, wherein the process for preparing the second release film comprises: weighing 25-35 parts of nano cobalt oxide, 25-35 parts by weight of o-phenylenediamine, 25-35 parts of benzoyl peroxide, and 10-40 parts of hexamethylphosphoramide; injecting gas in a vacuum environment and apply high voltage to trigger discharge, and the ions generated during the discharge process collide with the target, causing the target material to fly out and collide with the substrate to form a thin film.

* * * * *